US012767155B2

(12) United States Patent
Ma et al.

(10) Patent No.: US 12,767,155 B2
(45) Date of Patent: Oct. 20, 2026

(54) MULTI-SENSOR SELF-ADAPTIVE FAILURE COMPENSATION SYSTEM AND METHOD

(71) Applicant: AUTOMOTIVE RESEARCH & TESTING CENTER, Changhua Hsien (TW)

(72) Inventors: Hsin-Tung Ma, Changhua Hsien (TW); Yun-Ling Chang, Changhua Hsien (TW)

(73) Assignee: AUTOMOTIVE RESEARCH & TESTING CENTER, Changhua Hsien (TW)

( * ) Notice: Subject to any disclaimer, the term of this patent is extended or adjusted under 35 U.S.C. 154(b) by 64 days.

(21) Appl. No.: 18/966,738

(22) Filed: Dec. 3, 2024

(65) Prior Publication Data

US 2026/0152194 A1 Jun. 4, 2026

(51) Int. Cl.
*B60W 50/029* (2012.01)
*B60W 50/02* (2012.01)

(52) U.S. Cl.
CPC ...... *B60W 50/029* (2013.01); *B60W 50/0205* (2013.01); *B60W 2050/0215* (2013.01); *B60W 2556/20* (2020.02); *B60W 2556/35* (2020.02)

(58) Field of Classification Search
CPC ........... B60W 50/029; B60W 50/0205; B60W 2050/0215; B60W 2556/20; B60W 2556/35
See application file for complete search history.

(56) References Cited

U.S. PATENT DOCUMENTS

| | | | | |
|---|---|---|---|---|
| 11,427,211 | B2 * | 8/2022 | Hu | B60W 50/029 |
| 11,628,863 | B1 * | 4/2023 | Huang | B60W 60/0023 701/24 |
| 12,311,930 | B2 * | 5/2025 | Cordeiro | B60W 50/029 |
| 2019/0236862 | A1 * | 8/2019 | Mercep | G08G 1/16 |
| 2020/0349846 | A1 * | 11/2020 | Siboni | G06T 7/593 |
| 2022/0332327 | A1 * | 10/2022 | Lee | B60W 40/105 |
| 2024/0061424 | A1 * | 2/2024 | Kim | B60W 60/0015 |
| 2024/0199028 | A1 * | 6/2024 | Yun | G01S 17/931 |
| 2025/0388236 | A1 * | 12/2025 | Cai | B60W 50/029 |
| 2026/0094128 | A1 * | 4/2026 | Lambert | G06Q 10/20 |

* cited by examiner

*Primary Examiner* — Thomas Ingram
(74) *Attorney, Agent, or Firm* — Birch, Stewart, Kolasch & Birch, LLP

(57) ABSTRACT

A multi-sensor self-adaptive failure compensation system comprises multiple sensors and a processor. The processor is electrically connected to the multiple sensors. The processor generates a first fusion result according to the sensor information of the multiple sensors by a fusion module. The processor determines a characteristic relationship among the sensor information of the multiple sensors by a self-adaptive compensation module. The processor determines whether each sensor fails by a failure determination module, and generates a sensor compensation information corresponding to a failed sensor according to the sensor information of a valid sensor and the characteristic relationship by the self-adaptive compensation module. The processor generates a second fusion result according to the sensor information of the valid sensor and the sensor compensation information by the fusion module.

10 Claims, 11 Drawing Sheets

MULTI-SENSOR SELF-ADAPTIVE FAILURE COMPENSATION SYSTEM AND METHOD

BACKGROUND OF THE INVENTION

1. Field of the Invention

The present invention relates to a self-adaptive compensation system and method, and in particular to a multi-sensor self-adaptive failure compensation system and method.

2. Description of the Related Art

An autonomous vehicle is equipped with multiple sensors to sense the surrounding environment. The multiple sensors (e.g., camera, radar, optical radar) respectively have different sense functions. Each sensor can individually detect objects and output sensor information. The sensor information comprises an object detection result, such as a relative distance between the autonomous vehicle and a car in front of the autonomous vehicle detected by the sensors). Sensing ranges of some sensors overlap each other as a redundant sensing system. The multiple sensors respectively transmit their sensor information to a processor of the autonomous vehicle. The processor processes object information fusion by performing program data of Sensor Fusion technique to the sensor information of the sensors having overlapped sensing ranges to generate a fusion result. Therefore, the information of the fusion result also comprises the relative distance between the autonomous vehicle and the car in front of the autonomous vehicle. Because the sensors are installed on different positions of the autonomous vehicle and their object recognition principles may be different from each other, the relative distances between the autonomous vehicle and the car in front of the autonomous vehicle in the sensor information of the sensors and the fusion result are not completely the same.

The autonomous vehicle implements the relevant control and determination of autonomous driving according to the fusion result. By the operations of the redundant sensing system and the Sensor Fusion technique, when a certain sensor fails by the cause such as sensor crash, weather influence, unstable signal transmission, or sensing range limitation, the sensor information of other sensors may also ensure the operation of the Sensor Fusion technique.

However, while a certain sensor fails, although the processor can ensure the operation of the Sensor Fusion technique through the sensor information of other sensors, the fusion result is substantially affected. For example, when the camera fails, only the radar and the optical radar can detect objects. At that time, the camera fails to output its sensor information to the processor. So, the fusion result generated by the processor via the Sensor Fusion technique does not have the continuity. Or, the processor even fails to output the fusion results due to lack of sensor information from the camera. Consequently, the processor may have mis-operations when implementing the control and determination of autonomous driving, or even stop the autonomous driving function.

SUMMARY OF THE INVENTION

An objective of the present invention is to provide a multi-sensor self-adaptive failure compensation system and a method thereof to overcome the problem that overall performance of object detection is affected by the failure of a certain sensor in the redundant sensor system as described in the prior art.

The multi-sensor self-adaptive failure compensation system of the present invention comprises multiple sensors and a processor. Each sensor transmits a sensor information. The processor is electrically connected to the multiple sensors and comprises a fusion module generating a first fusion result or a second fusion result; a failure determination module connected to the multiple sensors and the fusion module to transmit the sensor information of the multiple sensors to the fusion module for the fusion module to generate the first fusion result; and a self-adaptive compensation module connected to the multiple sensors, the failure determination module, and the fusion module and determining a characteristic relationship among the sensor information of the multiple sensors. When the failure determination module determines that one of the multiple sensors fails, the failure determination module transmits a failure message to the self-adaptive compensation module, such that a failed sensor is defined among the multiple sensors, and a non-failed sensor is defined as a valid sensor among the multiple sensors. When the self-adaptive compensation module receives the failure message, the self-adaptive compensation module generates a sensor compensation information corresponding to the failed sensor based on the sensor information of the valid sensor and the characteristic relationship, and further transmits the sensor information of the valid sensor and the sensor compensation information to the fusion module for the fusion module to generate the second fusion result.

The multi-sensor self-adaptive failure compensation method of the present invention is performed by a processor electrically connected to multiple sensors and comprises steps as follows: generating a first fusion result based on sensor information of the multiple sensors; determining a characteristic relationship among the sensor information of the multiple sensors; determining whether there is a failed sensor among the multiple sensors to generate a sensor compensation information corresponding to the failed sensor based on the sensor information of a valid sensor among the multiple sensors and the characteristic relationship; and generating a second fusion result based on the sensor information of the valid sensor and the sensor compensation information.

The present invention can determine the characteristic relationship among the sensor information of the multiple sensors that do not fail and the current first fusion result. When a certain sensor fails, the sensor compensation information would be generated based on the sensor information of the valid sensor and the characteristic relationship to achieve the technical effect of self-adaptive compensation by use of the sensor compensation information. Therefore, the present invention improves the object detection performance and stability, reduces discontinuity of the output information, and achieves driving stability. It would avoid that the system may shut down the self-driving function. Driving safety, stability, and comfort would be achieved by the present invention.

DETAILED DESCRIPTION OF THE INVENTION

Figure 1:
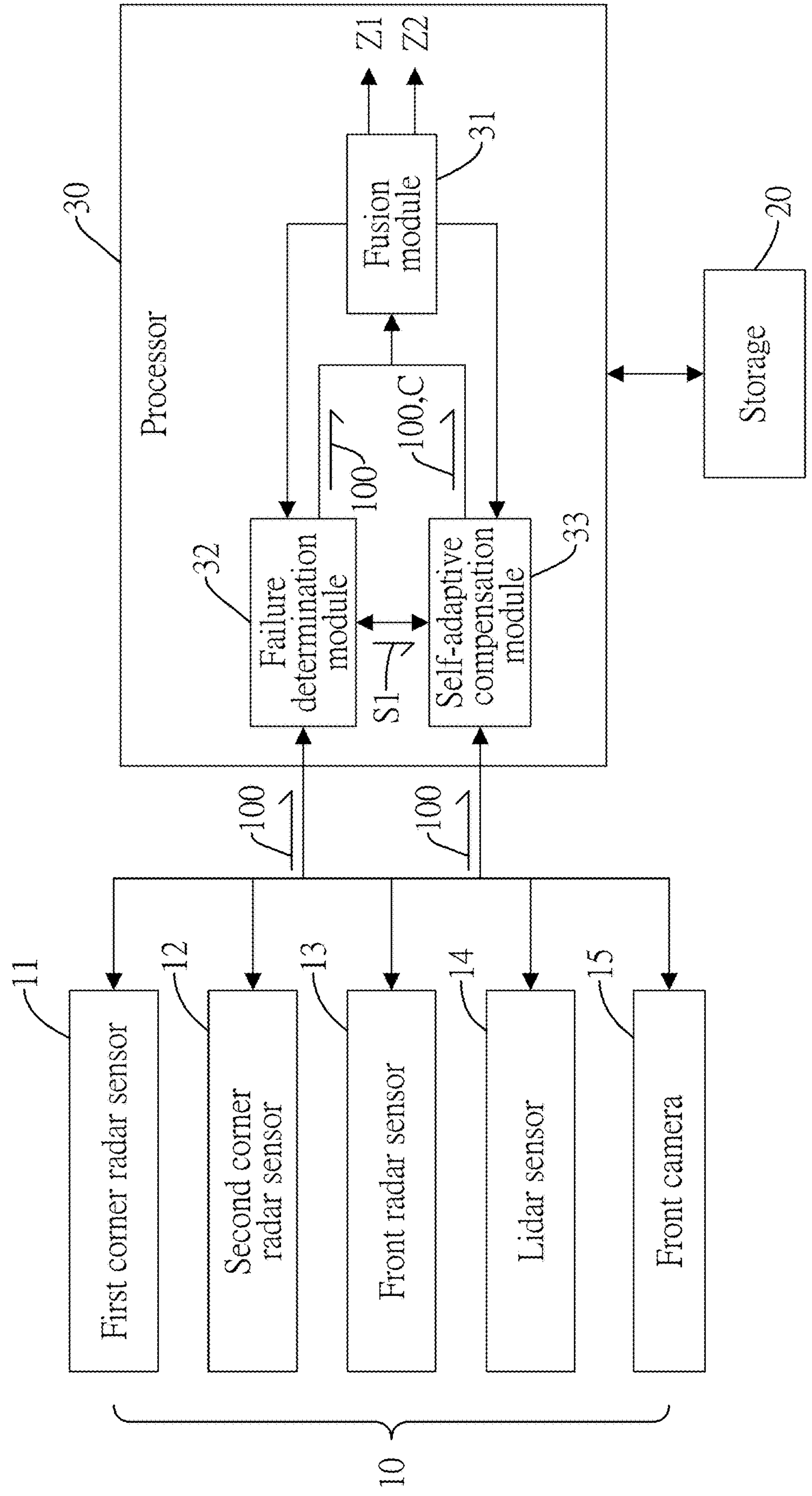
FIG. 1 is a block diagram of an embodiment of the multi-sensor self-adaptive failure compensation system of the present invention.
Figure 2:
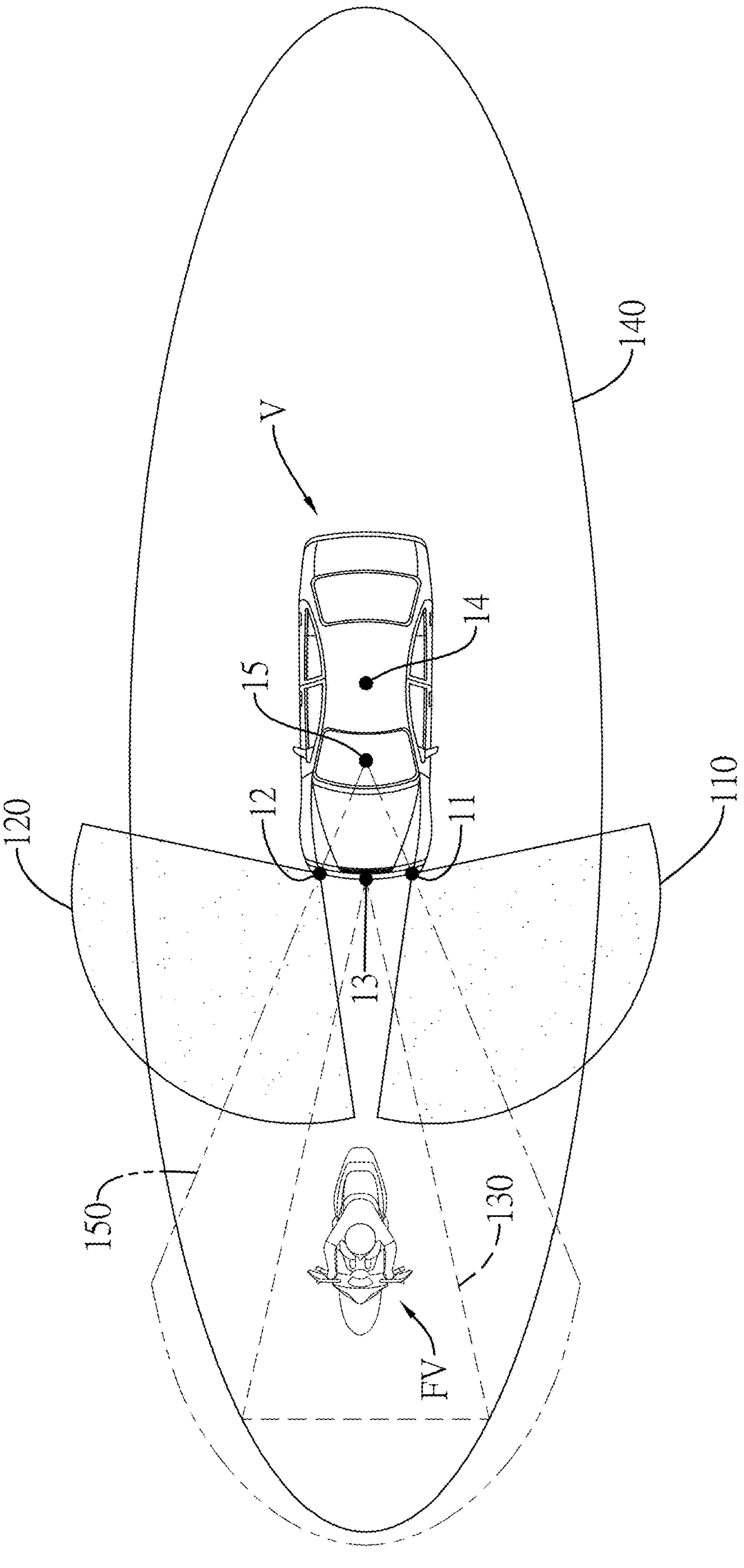
FIG. 2 is a top view of the sensing ranges of the multiple sensors arranged on a vehicle according to the present invention.

With reference to FIG. 1 and FIG. 2, the multi-sensor self-adaptive failure compensation system of the present invention is applied to a vehicle V and comprises multiple sensors 10, a storage 20, and a processor 30. The vehicle V may be an autonomous (self-driving) vehicle. The multiple sensors 10 are respectively mounted and arranged in/on the vehicle V to sense the surrounding environment of the vehicle V. The storage 20 may be mounted in the vehicle V for storing data. For example, the storage 20 may be a hard disk drive (HDD), a solid-state drive (SSD), a memory, or a memory card. The processor 30 may be a vehicle control unit (VCU) or an electronic control unit (ECU) mounted in the vehicle V. The processor 30 is electrically connected to the multiple sensors 10 and the storage 20. Each of the sensors 10 can individually detect an object and output a sensor information 100 to the processor 30. The sensor information 100 of each sensor 10 comprises an object detection result. For example, the object detection result of the sensor information 100 may comprise a car (hereinafter referred to as a target object FV) in front of the vehicle V and a relative distance between the target object FV and the vehicle V.

As an example, to sense the surrounding environment in front of the vehicle V, the multiple sensors 10 comprise two or more than two of a first corner radar sensor 11, a second corner radar sensor 12, a front radar sensor 13, a light detection and ranging (LIDAR) sensor 14, and a front camera 15. The first corner radar sensor 11 and the second corner radar sensor 12 may be respectively mounted on the front-left side and the front-right side of the vehicle V.

Each sensor 10 has its own sensing range, known as field of view (FOV). When the multiple sensors 10 are installed on the vehicle V, each sensor 10 can be arranged on an appropriate position based on requirements, and the sensing ranges of any two of the multiple sensors 10 can overlap each other. The storage 20 may store information of a pairing table, which is preset in the storage 20, to define the pairing status among the multiple sensors 10. Any two paired sensors 10 represent that the sensing ranges of the two sensors 10 overlap each other. With reference to FIG. 2 for example, the sensing range 110 of the first corner radar sensor 11, the sensing range 130 of the front radar sensor 13, the sensing range 140 of the LIDAR sensor 14, and the sensing range 150 of the front camera 15 overlap each other, so the first corner radar sensor 11, the front radar sensor 13, the LIDAR sensor 14, and the front camera 15 are paired with each other. Similarly, the sensing range 120 of the second corner radar sensor 12, the sensing range 130 of the front radar sensor 13, the sensing range 140 of the LIDAR sensor 14, and the sensing range 150 of the front camera 15 overlap each other, so the second corner radar sensor 12, the front radar sensor 13, the LIDAR sensor 14, and the front camera 15 are paired with each other. The sensing ranges 110, 120 of the first corner radar sensor 11 and the second corner radar sensor 12 do not overlap each other, so the first corner radar sensor 11 and the second corner radar sensor 12 are not paired with each other. The processor 30 may read the pairing table from the storage 20 to determine the pairing status of the sensors 10 by searching the pairing table.

The processor 30 can execute program data of a fusion module 31, a failure determination module 32, and a self-adaptive compensation module 33. The program data of the fusion module 31, the failure determination module 32, and the self-adaptive compensation module 33 are stored in the storage 20 for access and execution by the processor 30. With reference to FIG. 1, the failure determination module 32 is connected to the multiple sensors 10 and the fusion module 31. The self-adaptive compensation module 33 is connected to the multiple sensors 10, the failure determination module 32, and the fusion module 31.

The processor 30 generates information of a first fusion result Z1 or a second fusion result Z2 through the fusion module 31. The first fusion result Z1 is generated by the fusion module 31 according to the sensor information 100 of the multiple sensors 10 (the multiple sensors 10 are all valid). Or, at least one of the multiple sensors 10 may fail, such that the second fusion result Z2 is generated by the fusion module 31 according to the sensor information 100 of valid sensor(s) among the multiple sensors 10 (i.e., at least one sensor fails) and a sensor compensation information C. Sensor Fusion technique is common knowledge in the technical field and would not be described in detail herein. Therefore, the information of the first fusion result Z1 and the information of the second fusion result Z2 also respectively comprise information of the object detection result (i.e., the target object FV and the relative distance between the target object FV and the vehicle V).

The processor 30 can determine whether one of the multiple sensors 10 fails by the failure determination module 32. The present invention provides three embodiments of the processor 30 to determine whether the sensor 10 fails and will describe them below. When the processor 30 determines that one of the multiple sensors 10 fails by the failure determination module 32, the failure determination module 32 transmits a failure message S1 to the self-adaptive compensation module 33. The failure message S1 may be a failure flag. When the failure determination module 32 determines that the multiple sensors 10 are all valid, the processor 30 transmits the sensor information 100 of the multiple sensors 10 by the failure determination module 32 to the fusion module 31 for the fusion module 31 to generate the first fusion result Z1. The processor 30 may store the first fusion result Z1 in the storage 20. Further, the processor 30 determines information regarding a characteristic relationship among the sensor information 100 of the multiple sensors 10 by the self-adaptive compensation module 33. The characteristic relationship may comprise: (1) difference information between the object detection result of the sensor information 100 of one sensor 10 and the object detection result of the sensor information 100 of other sensors 10 respectively; and (2) the difference information between the object detection result of the sensor information 100 of each sensor 10 and the object detection result of the first fusion result Z1. Or, the characteristic relationship may further comprise the difference information between the object detection result of the sensor information 100 of each sensor 10 and the object detection result of the second fusion result Z2.

For convenience in explanation and understanding, a failed sensor is defined among the multiple sensors 10, and a non-failed sensor is defined as a valid sensor among the multiple sensors 10. When the self-adaptive compensation module 33 receives the failure message S1, the processor 30 generates the sensor compensation information C according to the sensor information 100 of the valid sensor(s) and the characteristic relationship. The sensor compensation information C comprises the target object FV and the relative distance between the target object FV and the vehicle V. Therefore, the sensor compensation information C corresponds to the failed sensor(s) and can compensate for the lack of sensor information from the failed sensor. Then, the self-adaptive compensation module 33 transmits the sensor information 100 of the valid sensor(s) and the sensor compensation information C to the fusion module 31 for the processor 30 to generate the second fusion result Z2 by the fusion module 31. The processor 30 may store the second fusion result Z2 in the storage 20.

The processor 30 may implement relevant control and decision-making for autonomous driving for the vehicle V based on either the first fusion result Z1 or the second fusion result Z2. The first fusion result Z1 is adopted when all of the multiple sensors 10 are determined as the valid sensors. The second fusion result Z2 is adopted when at least one sensor 10 is determined as the failed sensor. By doing so, the present invention will stabilize the state of the autonomous driving and avoid affecting or accidentally interrupting the autonomous driving function.

Figure 3A:
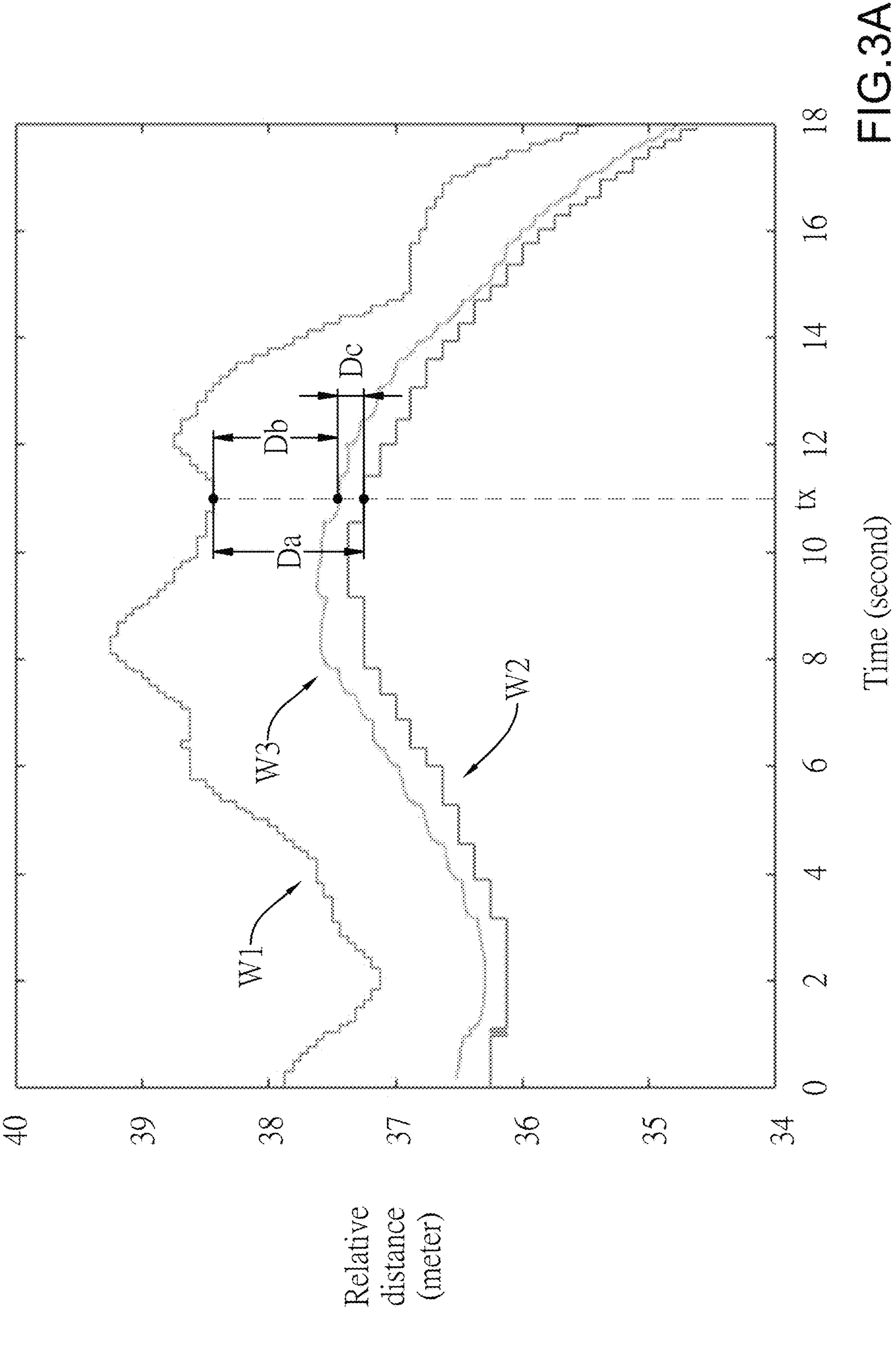
FIG. 3A is a waveform diagram (I) of the simulation result of the present invention.

The simulation results as example of the present invention are described below. The multiple sensors 10 comprise the front camera 15 and the front radar sensor 13. FIG. 3A depicts a first waveform W1, a second waveform W2, and a third waveform W3. The first waveform W1 represents the relative distance between the vehicle V and the target object FV in the sensor information 100 of the front camera 15. The second waveform W2 represents the relative distance between the vehicle V and the target object FV in the sensor information 100 of the front radar sensor 13. The third waveform W3 represents the relative distance between the vehicle V and the target object FV in the first fusion result Z1. Because the front camera 15 and the front radar sensor 13 are installed on different positions of the vehicle V and their object recognition principles may be different from each other, the relative distances shown by the first waveform W1, the second waveform W2, and the third waveform W3 are not completely the same, but the trends of the waveforms W1,W2,W3 are consistent with each other.

As mentioned above, the processor 30 determines the characteristic relationship of the sensor information 100 of each sensor 10 by the compensation module 33. With reference to FIG. 3A, at any time point tx, the characteristic relationship corresponding to the front camera 15 comprises a first relative distance difference Da and a second relative distance difference Db. The first relative distance difference Da indicates the difference information between the relative distances between the vehicle V and the target object FV in the sensor information 100 of the front camera 15 (i.e., the first waveform W1) and of the front radar sensor 13 (i.e., the second waveform W2). That is, the first relative distance difference Da is the difference value between the first waveform W1 and the second waveform W2 at the time point tx. The second relative distance difference Db indicates the difference information between the relative distances between the vehicle V and the target object FV in the sensor information 100 of the front camera 15 (i.e., the first waveform W1) and of the first fusion result Z1 (i.e., the third waveform W3). That is, the second relative distance difference Db is the difference value between the first waveform W1 and the third waveform W3 at the time point tx.

The characteristic relationship corresponding to the front radar sensor 13 comprises the first relative distance difference Da and a third relative distance difference Dc. The third relative distance difference Dc indicates the difference information between the relative distances between the vehicle V and the target object FV in the sensor information 100 of the front radar sensor 13 (i.e., the second waveform W2) and of the first fusion result Z1 (i.e., the third waveform W3). That is, the third relative distance difference Dc is the difference value between the third waveform W3 and the second waveform W2 at the time point tx. It could be deduced that the processor 30 may also determine a characteristic relationship corresponding to the first fusion result Z1, comprising the second relative distance difference Db and the third relative distance difference Dc by the self-adaptive compensation module 33.

Figure 3B:
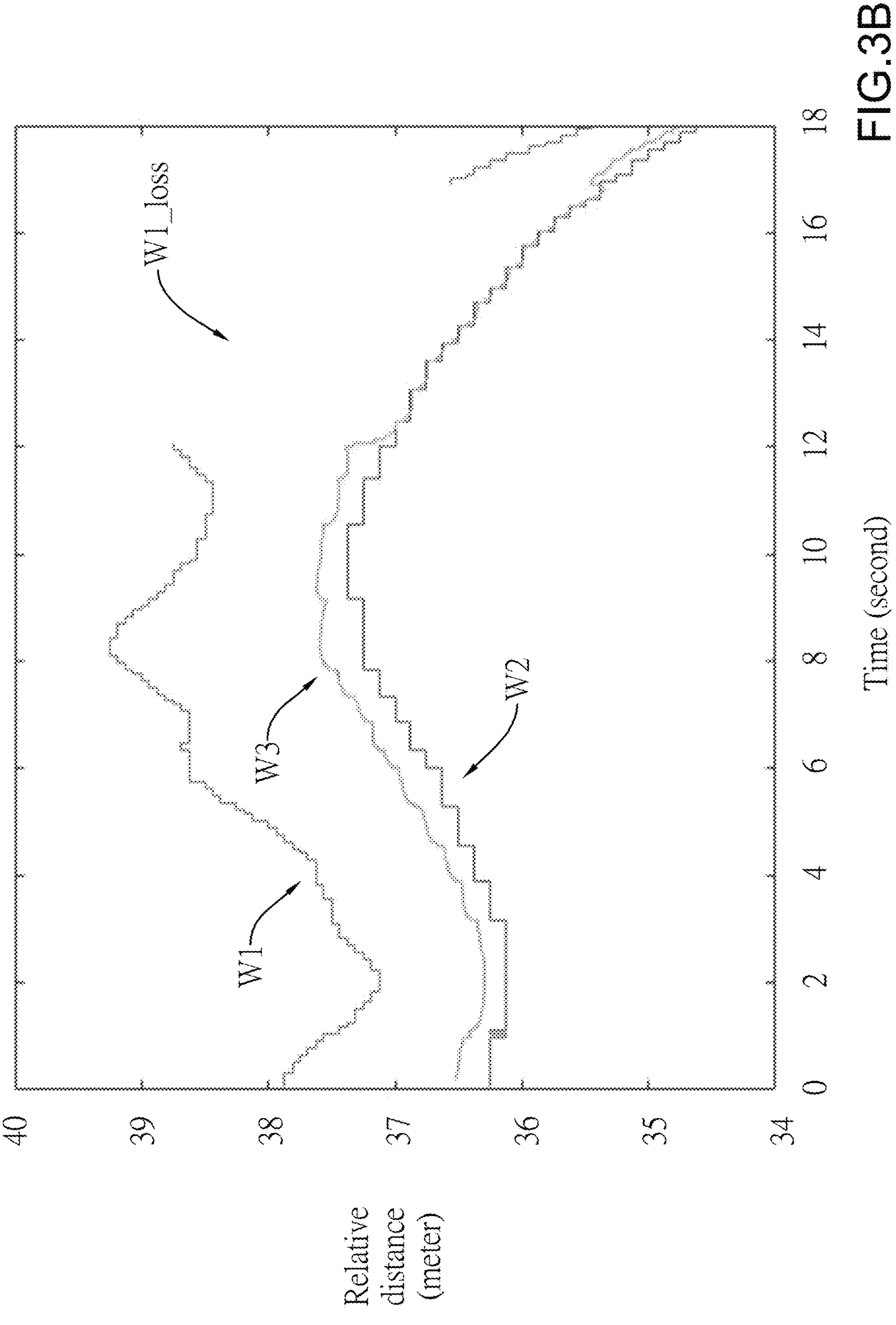
FIG. 3B is a waveform diagram (II) of the simulation result of the present invention.

With reference to FIG. 3B, there is an interruption interval (W1_loss) within the twelfth second and the eighteenth second in the first waveform W1, which means the front camera 15 fails during the interruption interval (W1_loss). The third waveform W3 approaches and overlaps the second waveform W2 during the interruption interval (W1_loss), which represents that the first fusion result Z1 almost completely depends on the sensor information 100 of the front radar sensor 13.

Figure 3C:
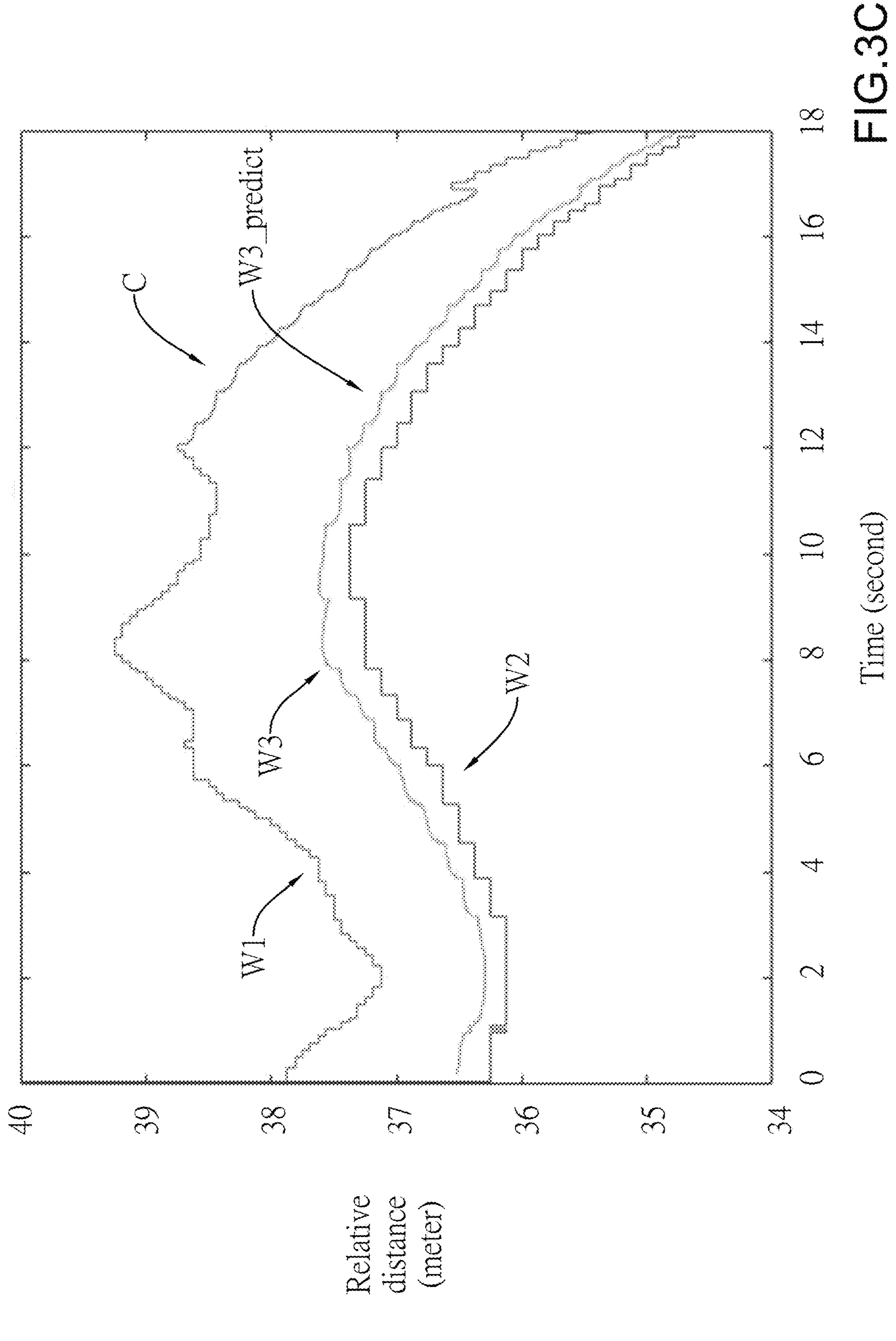
FIG. 3C is a waveform diagram (III) of the simulation result of the present invention.

With reference to FIG. 3C, by the self-adaptive compensation method of the present invention, the interruption interval (W1_loss) of the first waveform W1 in FIG. 3B will be compensated by the waveform of the sensor compensation information C to achieve the continuation of the first waveform W1. Besides, the trend of the third waveform W3 in FIG. 3C is more similar to the trend of the third waveform W3 in FIG. 3A than in FIG. 3B, reflecting the successful compensation effect of the sensor compensation information C.

The multi-sensor self-adaptive failure compensation method of the present invention is described as follows.

Figure 4:
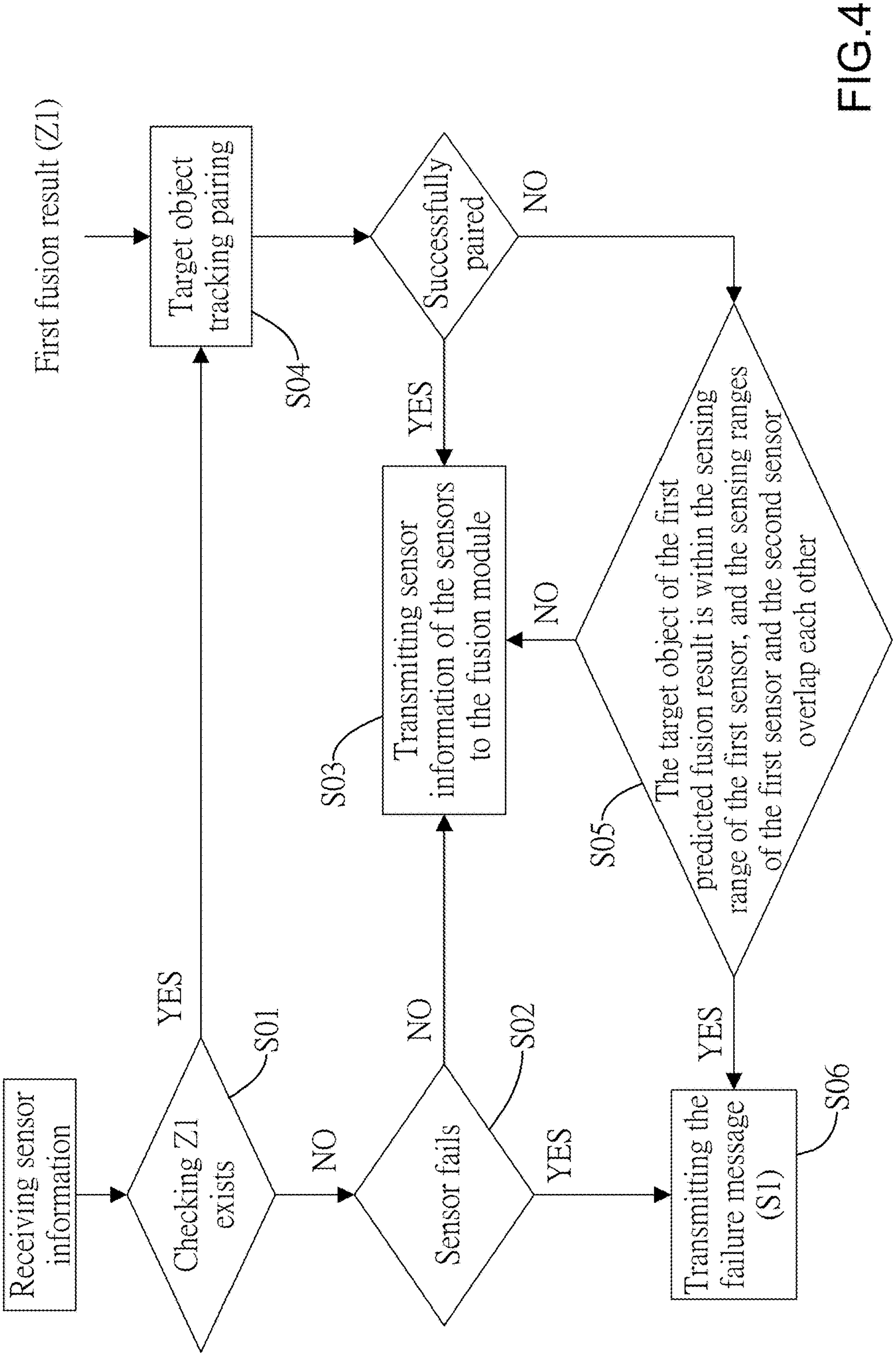
FIG. 4 is a flowchart of a first embodiment of a processor to generate a failure message according to the present invention.

With reference to FIG. 4, after the processor 30 receives the sensor information 100 of the multiple sensors 10, the processor 30 checks whether the first fusion result Z1 exists (Step S01). For example, each time the fusion module 31 generates the first fusion result Z1, the fusion module 31 also outputs a flag for the processor 30 to check whether the first fusion result Z1 exists according to the flag.

When the determination result of the step S01 is "No", the processor 30 further determines whether the multiple sensors 10 fail respectively (Step S02). For example, a count value is transmitted with the sensor information 100 by the sensor 10 to the processor 30. Typically, the difference between two count values of two consecutive sensor information 100 received by the processor 30 from the same sensor 10 should not be 0. Therefore, when the processor 30 determines that the difference between the two count values is 0, the processor 30 may determine that the sensor 10 fails. When the determination result of the step S02 is "No", which means none of the multiple sensors 10 fails, the processor 30 then transmits the sensor information 100 of the multiple sensors 10 to the fusion module 31 by the failure determination module 32 (Step S03) for the fusion module 31 to generate the first fusion result Z1.

Figure 5:
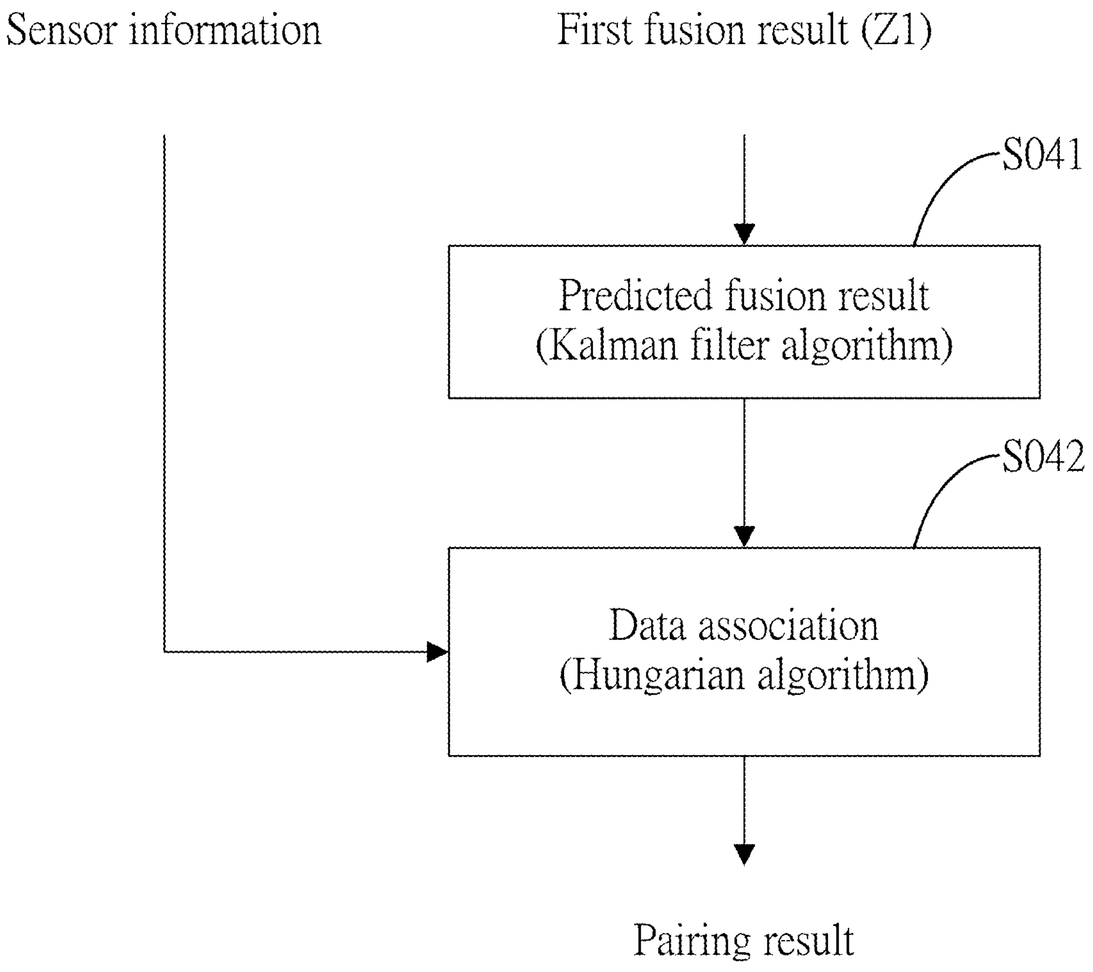
FIG. 5 is a flowchart of target object tracking pairing in the present invention.

The first embodiment of the processor 30 to generate the failure message S1 by the failure determination module 32 is described as follows. For convenience in explanation and understanding, for example, the multiple sensors 10 comprise a first sensor and a second sensor. The first sensor and the second sensor are paired in the foregoing pairing table stored in the storage 20. With reference to FIG. 4, when the determination result of the step S01 is "Yes", the processor 30 performs a target object tracking pairing to the sensor information 100 of the multiple sensors 10 with the first fusion result Z1 by the failure determination module 32 (step S04) to determine whether the sensor information 100 of the multiple sensors 10 and the first fusion result Z1 recognize the same target object FV. The process of the foregoing target object tracking pairing is shown in FIG. 5, which is common knowledge in the relevant technical field. In brief, the processor 30 executes an algorithm program data of Kalman filter to generate a first predicted fusion result based on the first fusion result Z1 (Step S041), and then executes program data of a data association algorithm, such as Hungarian algorithm, to generate a pairing result based on the first predicted fusion result and the sensor information of the first sensor (step S042). The information of the pairing result may be, for example, "True" or "1" to represent the first sensor is successfully paired. At this moment, the processor 30 may recognize the same target object FV from the sensor information of the first sensor and the first predicted fusion result. In contrast, the information of the pairing result may be, for example, "False" or "0" to represent the first sensor is unsuccessfully paired. At this moment, the processor 30 fails to recognize the same target object FV from the sensor information of the first sensor and the first predicted fusion result. So, it could be deduced for the second sensor. As mentioned above, the program data of the Kalman filter algorithm and the Hungarian algorithm may be stored in the storage 20 for access and execution by the processor 30.

When both the first sensor and the second sensor are successfully paired, the processor 30 transmits the sensor information 100 of the multiple sensors 10 to the fusion module 31 by the failure determination module 32 for the fusion module 31 to generate a next first fusion result at a next time point, and the next first fusion result can be stored in the storage 20 by the processor 30. When the first sensor is unsuccessfully paired, the processor 30 determines whether the target object FV of the first predicted fusion result is within the sensing range of the first sensor by the failure determination module 32 (Step S05). The processor 30 may establish spatial coordinate information around the vehicle V, so the positions of the vehicle V, the target object FV, and the sensing ranges of the multiple sensors 10 can be positioned by coordinate information, which is common knowledge in the related art and would not be described in detail herein. Therefore, the processor 30 may determine whether the target object FV of the first predicted fusion result falls within the sensing range of the first sensor according to the coordinate information. Besides, the processor 30 also determines whether the sensing ranges of the first sensor and the second sensor overlap each other by the failure determination module 32 (Step S05). In the embodiment of the present invention, the processor 30 may determine whether the sensing ranges of the first sensor and the second sensor overlap each other according to the pairing table stored in the storage 20.

If the determination result of the step S05 is "No", which means the target object FV in the first predicted fusion result does not fall within the sensing range of the first sensor and/or the sensing ranges of the first sensor and the second sensor do not overlap each other, the processor 30 transmits the sensor information 100 of the multiple sensors 10 to the fusion module 31 by the failure determination module 32 (Step S03) for the fusion module 31 to generate the next first fusion result at the next time point. This situation may result from the target object FV moving out of the sensing ranges of some sensors 10.

If the determination result of the step S05 is "Yes", which means the target object FV in the first prediction fusion result falls within the sensing ranges of the first sensor and the second sensor and the sensing ranges of the first sensor and the sensor overlap each other, the sensor information of the second sensor has the target object FV but the sensor information of the first sensor does not have the target object FV, the processor 30 then determines the first sensor as the failed sensor and determines the second sensor as the valid sensor by the failure determination module 32, and the failure determination module 32 transmits the failure message S1 to the self-adaptive compensation module 33 (Step S06).

Figure 6:
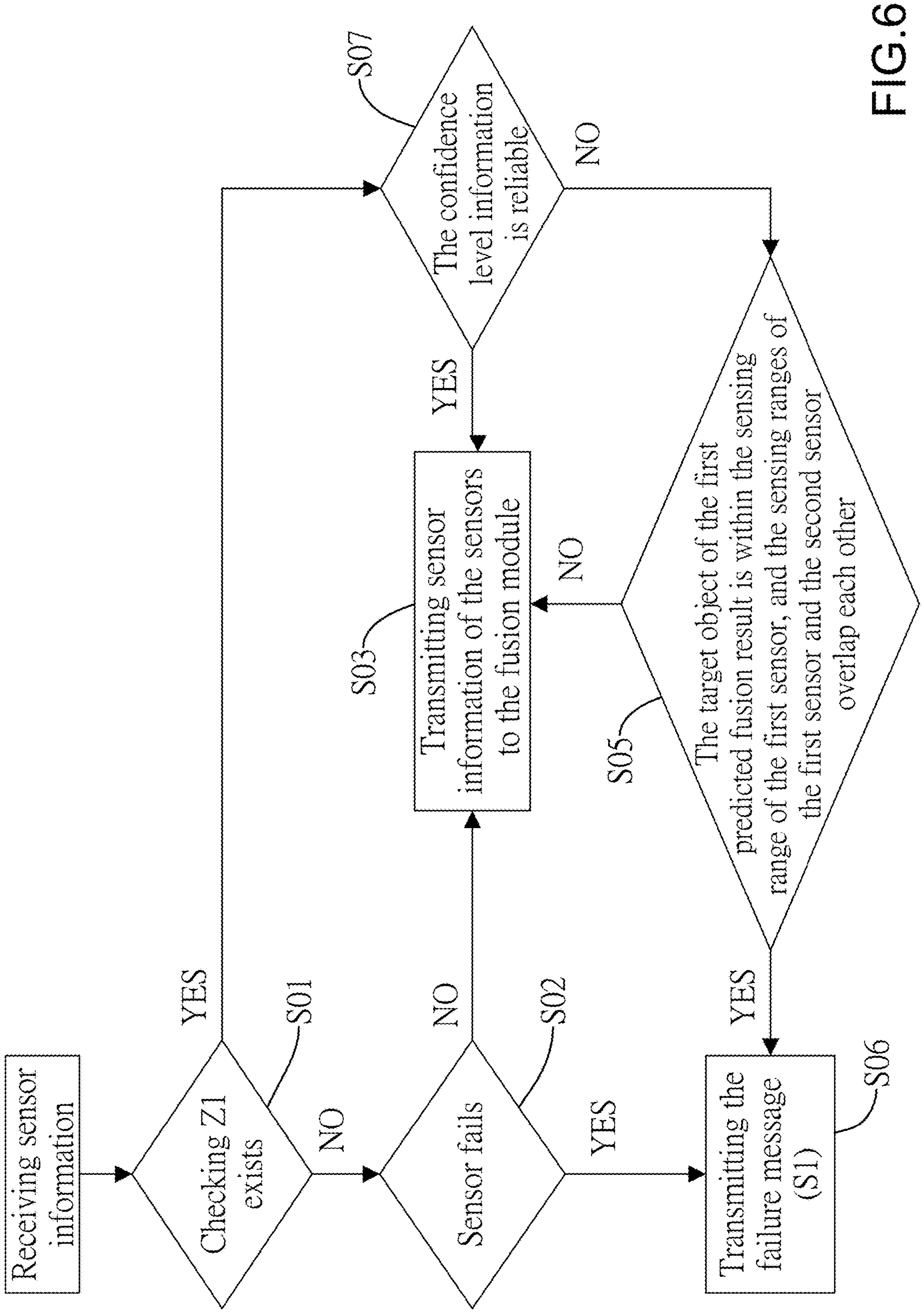
FIG. 6 is a flowchart of a second embodiment of the processor to generate a failure message according to the present invention.

The second embodiment of the processor 30 to generate the failure message S1 by the failure determination module 32 is described as follows. With reference to FIG. 6, the sensor information 100 transmitted by each sensor 10 to the processor 30 may comprise a confidence level information. The confidence level information may be "True" or "False" for example, respectively representing the object detection result is reliable or not. Therefore, the processor 30 may respectively determine whether the confidence level information of the multiple sensors 10 is reliable by the failure determination module 32 (Step S07). If the determination result of the step S07 is "No", which means the sensor information 100 of some of the sensors 10 is unreliable, then as described in the foregoing step S05, the processor 30 defines the failed sensor(s) and the valid sensor(s) from the multiple sensors 10 by the failure determination module 32, and the failure determination module 32 transmits the failure message S1 to the self-adaptive compensation module 33. If the determination result of the step S07 is "Yes", which means the sensor information 100 of the multiple sensors 10 is reliable, the processor 30 transmits the sensor information 100 of the multiple sensors 10 to the fusion module 31 by the failure determination module 32 (step S03) for the fusion module 31 to generate the next first fusion result.

Figure 7:
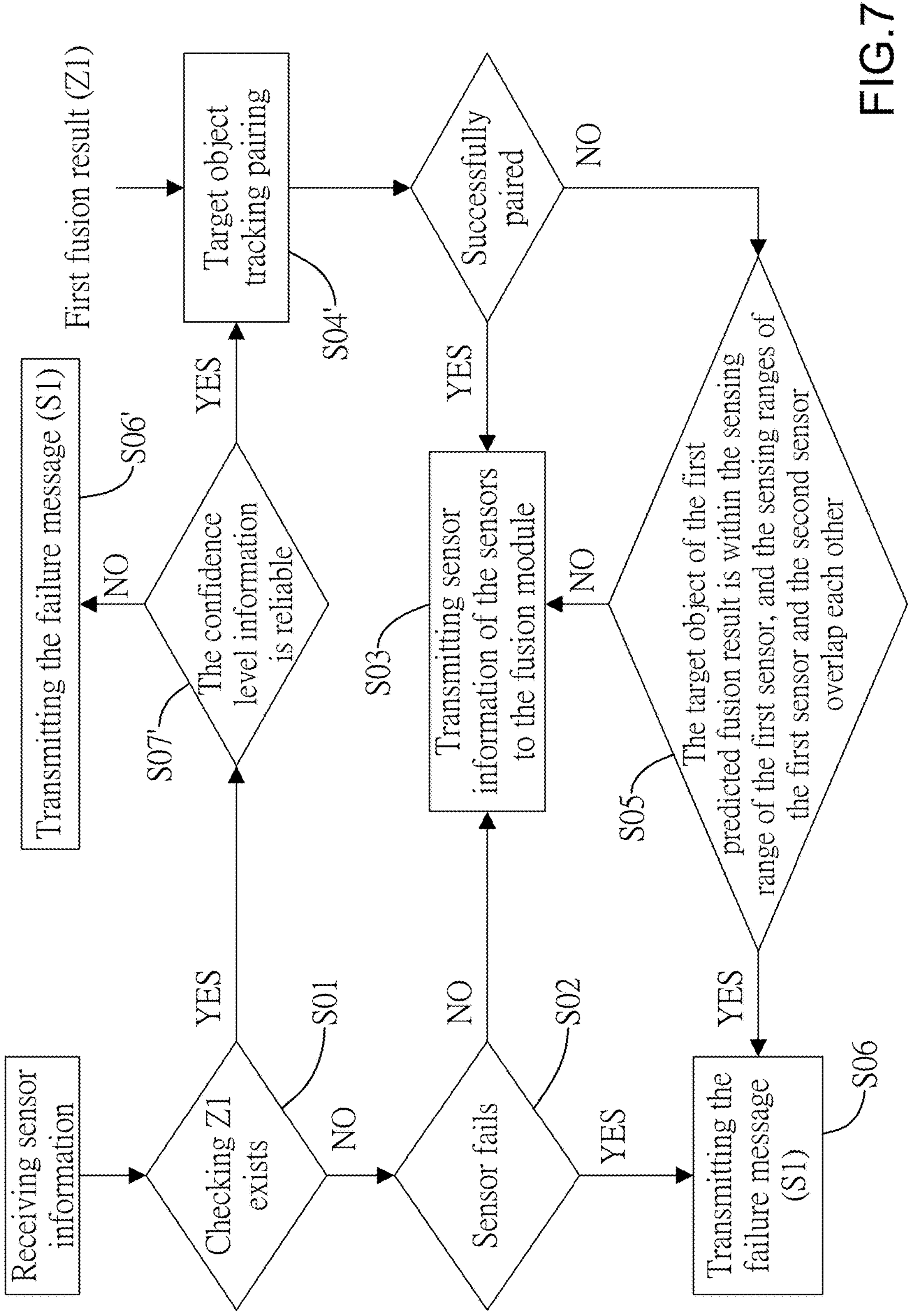
FIG. 7 is a flowchart of a third embodiment of the processor to generate a failure message according to the present invention.

The third embodiment of the processor 30 to generate the failure message S1 by the failure determination module 32 is described as follows. With reference to FIG. 7, the third embodiment is a combination of the first embodiment and second embodiment. When the determination result of the step S01 is "Yes", the processor 30 further determines whether the confidence level information of the multiple sensor 10 is reliable or not by the failure determination module 32 (Step S07'). When the determination result of the step S07' is "No", the processor 30 further transmits the failure message S1 to the self-adaptive compensation module 33 by the failure determination module 32 (Step S06').

When the determination result of the step S07' is "Yes", the processor 30 further performs the target object tracking pairing to the sensor information 100 of the multiple sensors 10 with the first fusion result Z1 respectively by the failure determination module 32 (Step S04'). As described in the foregoing example, the multiple sensors 10 comprise a first sensor and a second sensor. When the first sensor and the second sensor are successfully paired, the processor 30 transmits the sensor information 100 of the multiple sensors 10 to the fusion module 31 by the failure determination module 32 (Step S03) for the fusion module 31 to generate the next first fusion result of the next time point. When the first sensor is unsuccessfully paired, the processor 30 performs the Step S05 by the failure determination module 32 as mentioned above and would be repeated herein.

The foregoing three embodiments describe the processor 30 to generate the failure message S1 by the self-adaptive compensation module 33. Moreover, the operations of the processor 30 while receiving and not receiving the failure message S1 by the self-adaptive compensation module 33 are described as follows.

Figure 8:
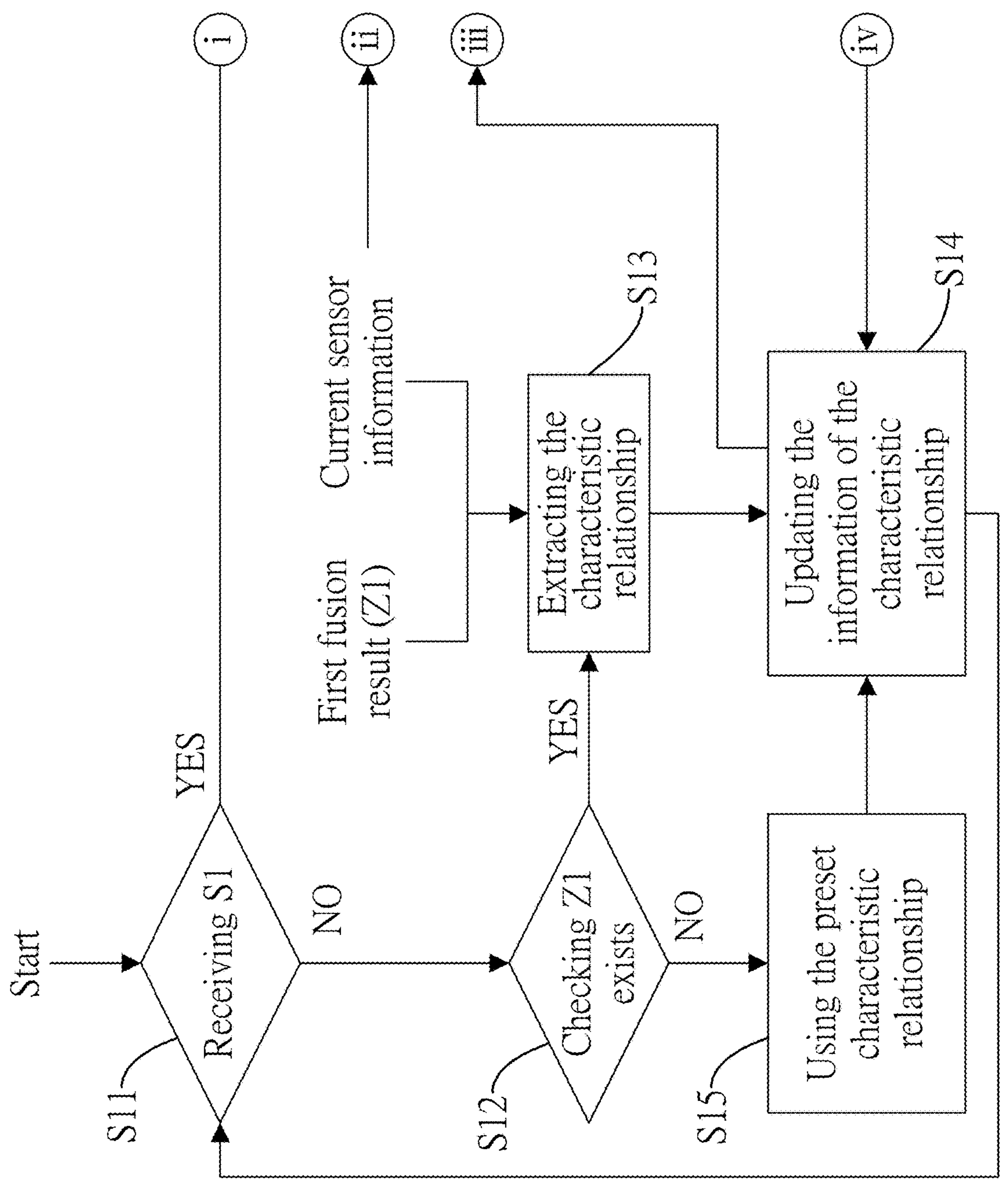
FIG. 8 is a flowchart (I) of the processor to perform self-adaptive compensation according to the present invention.

With reference to FIG. 8, the processor 30 determines whether the failure message S1 is received from the failure determination module 32 by the self-adaptive compensation module 33 (Step S11). If the determination result of the step S11 is "No", which means the processor 30 does not determine any failed sensor by the failure determination module 32, the processor 30 then further checks whether the first fusion result Z1 exists (Step S12) that would be deduced from the foregoing step S01. If the determination result of the step S12 is "Yes", the processor 30 extracts the characteristic relationship by the self-adaptive compensation module 33 based on the first fusion result Z1 and the sensor information 100 of the multiple sensors 10 (Step S13), and further updates the information of the characteristic relationship (Step S14). If the determination result of the step S12 is "No", the processor 30 reads information of a preset characteristic relationship from the storage 20 by the self-adaptive compensation module 33 (Step S15) for update. The purpose of the steps S13 to S15 is to instantly track the target object FV in front of the vehicle V via the updated information of the feature relationship.

Figure 9:
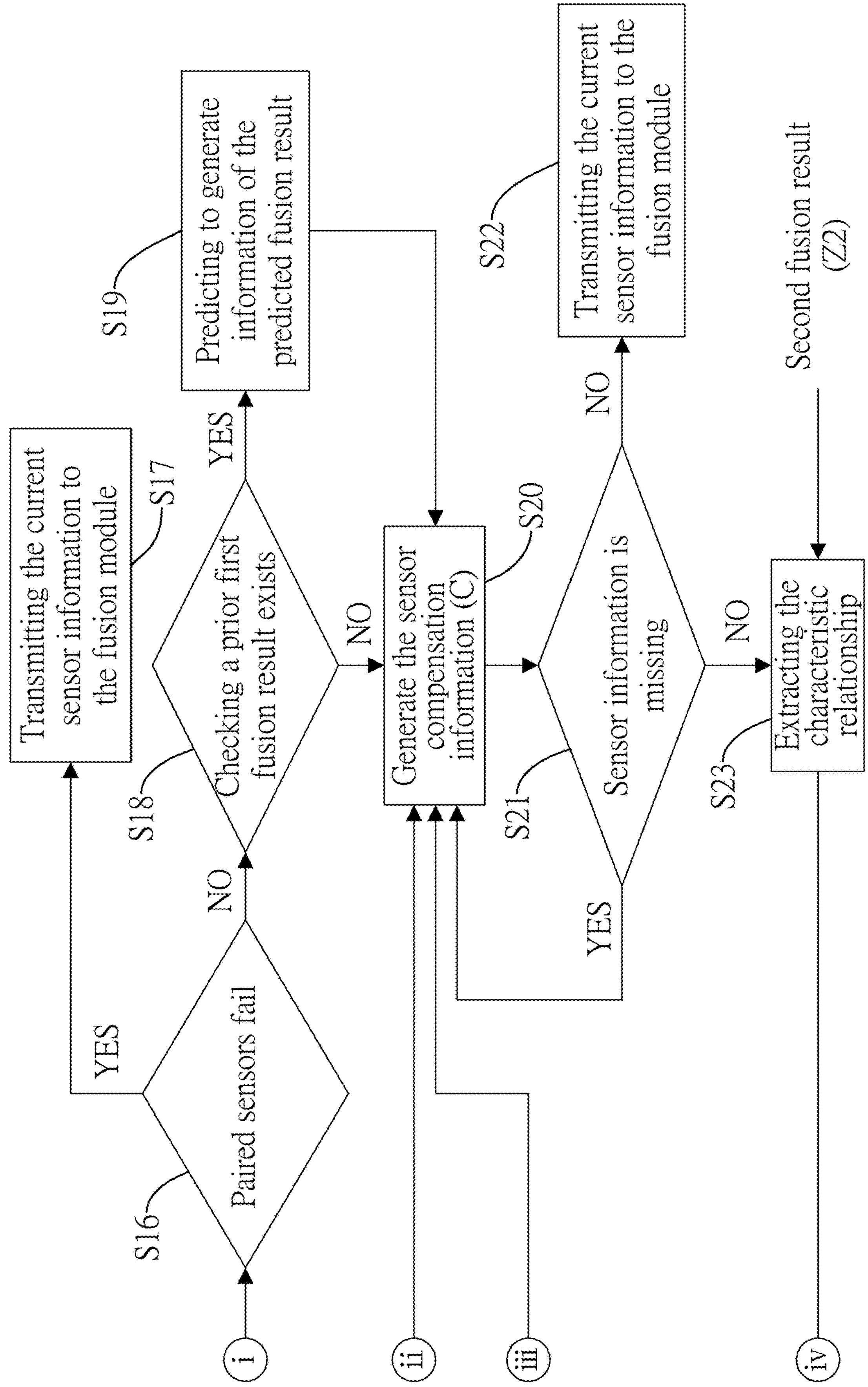
FIG. 9 is a flowchart (II) of the processor to perform self-adaptive compensation according to the present invention.

With reference to FIG. 9, if the determination result of the step S11 is "Yes", the processor 30 further determines whether the sensors that are paired fail by the self-adaptive compensation module 33 (Step S16). As described in the foregoing example, the processor 30 determines whether the first sensor and the second sensor are the failed sensors. If the determination result of the step S16 is "Yes", which means the target object FV may move out of the sensing ranges of the first sensor and the second sensor at the same time rather than both the first sensor and the second sensor failing at the same time, the processor 30 then transmits the current sensor information 100 of the multiple sensors 10 to the fusion module 31 by the self-adaptive compensation module 33 (Step S17) for the fusion module 31 to generate a next first fusion result at a next time point.

If the determination result of the step S16 is "No", which means only a part of the multiple sensors 10 can sense the target object FV, as described in the foregoing example, only the second sensor (valid sensor) can sense the target object FV but the first sensor (failed sensor) does not sense the target object FV, the processor 30 then checks whether a prior first fusion result at a prior time point exists (Step S18). The processor 30 may store the first fusion result at the prior time point in the storage 20 by the fusion module 31 and define it as the prior first fusion result for checking.

If the determination result of the step S18 is "Yes", the processor 30 makes a prediction based on the prior first fusion result at the prior time point by the self-adaptive compensation module 33 to generate information of a predicted fusion result (Step S19). The processor 30 may also determine, by the self-adaptive compensation module 33, that a characteristic relationship corresponding to the predicted fusion result comprises the target object FV and a predicted relative distance between the target object FV and the vehicle V. The processor 30 may execute an algorithm program data of Kalman filter to generate the predicted fusion result based on the prior first fusion result at the prior time point. The characteristic relationship as mentioned above comprises a characteristic relationship between the predicted fusion result and the sensor information 100 of the multiple sensors 10 that do not fail. Therefore, the processor 30 may generate the sensor compensation information C by the self-adaptive compensation module 33 based on the sensor information 100 of the valid sensor(s) and the characteristic relationship (Step S20).

As described in the foregoing example, under the condition that both the front camera 15 and the front radar sensor 13 do not fail, the first relative distance difference (Da) is 1.3 meters, the second relative distance difference (Db) is 1.1 meters, and the third relative distance difference (Dc) is 0.2 meters. At a next time point, if the front camera 15 fails to be the failed sensor and the front radar sensor 13 is still the valid sensor, the processor 30 generates information of the predicted fusion result, wherein the predicted fusion result may correspond to a predicted waveform (W3_predict) as shown in FIG. 3C. The third relative distance difference while the front camera 15 fails should be a predicted difference information (e.g., 0.3 meters) between the relative distance (i.e., the second waveform W2) between the vehicle V and the target object FV in the sensor information 100 of the front radar sensor 13 (valid sensor) and the predicted relative distance (i.e., the predicted waveform (W3_predict)) between the vehicle V and the target object FV in the predicted fusion result. The predicted difference information as 0.3 meters plus the second relative distance difference Db as 1.1 meters (while both the front camera 15 and the front radar sensor 13 do not fail) equals the first relative distance difference as 1.4 meters (i.e., 0.3+1.1=1.4) as a prediction while the front camera 15 fails. The sensor compensation information C is generated according to the first relative distance which is predicted.

If the determination result of the step S18 is "No", the processor 30 reads information of a preset fusion result from the storage 20 by the self-adaptive compensation module 33. The characteristic relationship as described before is a characteristic relationship among the preset fusion result and the sensor information 100 of the multiple sensors 10 that do not fail. So, the processor 30 may generate the sensor compensation information C by the self-adaptive compensation module 33 based on the sensor information 100 of the valid sensor(s) and the characteristic relationship.

After the sensor compensation information C is generated, the processor 30 further determines whether any sensor information is missing by the self-adaptive compensation module 33 (Step S21). For example, with reference to FIG. 3B, when the processor 30 determines that the first waveform W1 is a discontinuous waveform due to the interruption interval (W1_loss), the processor 30 may determine that there is still lack of sensor information. If the determination result of the step S21 is "No", that means the missing sensor information has been compensated by the sensor compensation information C. As described in the foregoing example, with reference to FIG. 3C, the first waveform W1 already contains the sensor compensation information C. In other words, the interruption interval (W1_loss) is replaced by the sensor compensation information C. The processor 30 then proceeds to transmit the current sensor information 100 of the multiple sensors 10 to the fusion module 31 by the self-adaptive compensation module 33 (Step S22). The processor 30 also extracts the characteristic relationship based on the second fusion result Z2 by the self-adaptive compensation module 33 (Step S23), and then updates the information of the characteristic relationship according to the characteristic relationship extracted from the second fusion result Z2 (Step S14).

In conclusion, the present invention has the following technical effects.

1. With reference to the foregoing target object tracking pairing in the step S04, the processor 30 tracks the target object FV based on the prediction of the first fusion result Z1 to determine whether each sensor 10 fails to track the target object FV, and so to further determine whether each sensor 10 fails.
2. The processor 30 determines the characteristic relationship (distance) among the prior first fusion result of the prior time point, the current first fusion result Z1, and the current sensor information 100 of each sensor 10. When any sensor fails, the characteristic relationship can be used to self-adaptively generate the sensor compensation information C corresponding to the lack of sensor information from the failed sensor for the fusion module 31. By doing so, the discrepancy of distance detection for the target object or sensing failure would be avoided in the present invention.
3. The processor 30 improves the stability of object detection and tracking by the cooperative operation of the fusion module 31, the failure determination module 32, and the self-adaptive compensation module 33.

What is claimed is:

1. A multi-sensor self-adaptive failure compensation system applied to a self-driving vehicle and comprising:

multiple sensors respectively mounted and arranged in or on the self-driving vehicle to sense a surrounding environment of the self-driving vehicle, wherein sensing ranges of any two of the multiple sensors overlap each other, and each sensor is configured to detect an object and transmit a sensor information;

a storage storing information of a pairing table defining pairing statuses among the multiple sensors, wherein any two paired sensors represent that the sensing ranges of the two sensors overlap each other; and a processor electrically connected to the multiple sensors and the storage, reading the pairing table from the storage to determine the pairing statuses of the sensors by searching the pairing table, and comprising:

a fusion module generating a first fusion result or a second fusion result;

a failure determination module connected to the multiple sensors and the fusion module to transmit the sensor information of the multiple sensors to the fusion module for the fusion module to generate the first fusion result, wherein the processor stores the first fusion result in the storage; and a self-adaptive compensation module connected to the multiple sensors, the failure determination module, and the fusion module and configured to determine a characteristic relationship among the sensor information of the multiple sensors;

wherein when the failure determination module determines that one of the multiple sensors fails, the failure determination module transmits a failure message as a failure flag to the self-adaptive compensation module; such that a failed sensor is defined among the multiple sensors, and a non-failed sensor is defined as a valid sensor among the multiple sensors;

when the self-adaptive compensation module receives the failure message, the self-adaptive compensation module generates a sensor compensation information corresponding to the failed sensor based on the sensor information of the valid sensor and the characteristic relationship, and further transmits the sensor information of the valid sensor and the sensor compensation information to the fusion module, such that the sensor compensation information corresponds to the failed sensor to compensate for the lack of sensor information from the failed sensor, for the fusion module to generate the second fusion result, wherein the processor stores the second fusion result in the storage;

wherein the processor implements autonomous driving for the self-driving vehicle based on either the first fusion result or the second fusion result, the first fusion result is adopted when all of the multiple sensors are determined as valid sensors, and the second fusion result is adopted when at least one of the multiple sensors is determined as the failed sensor.

2. The system as claimed in claim 1, wherein:

the multiple sensors comprise a first sensor and a second sensor;

the failure determination module performs a target object tracking pairing to the sensor information of the multiple sensors with the first fusion result respectively;

when the first sensor and the second sensor are successfully paired, the failure determination module transmits the sensor information of the multiple sensors to the fusion module for the fusion module to generate a next first fusion result at a next time point; and when the first sensor is unsuccessfully paired, the failure determination module determines whether a target object of a first predicted fusion result is within a sensing range of the first sensor, and whether the sensing ranges of the first sensor and the second sensor overlap each other;

if No, the failure determination module transmits the sensor information of the multiple sensors to the fusion module for the fusion module to generate the next first fusion result; and if Yes, the failure determination module determines the first sensor as the failed sensor and transmits the failure message to the self-adaptive compensation module.

3. The system as claimed in claim 1, wherein:

the sensor information of each sensor comprises a confidence level information; and the failure determination module determines whether the confidence level information of the multiple sensors is reliable respectively;

if No, the failure determination module determines an unreliable sensor as the failed sensor and transmits the failure message to the self-adaptive compensation module; and if Yes, the failure determination module transmits the sensor information of the multiple sensors to the fusion module for the fusion module to generate a next first fusion result at a next time point.

4. The system as claimed in claim 1, wherein:

the sensor information of each sensor comprises a confidence level information;

the failure determination module determines whether the confidence level information of the multiple sensors is reliable respectively;

if No, the failure determination module determines an unreliable sensor as the failed sensor and transmits the failure message to the self-adaptive compensation module; and if Yes, the failure determination module performs a target object tracking pairing to the sensor information of the multiple sensors with the first fusion result respectively, wherein the multiple sensors comprise a first sensor and a second sensor;

when the first sensor and the second sensor are successfully paired, the failure determination module transmits the sensor information of the multiple sensors to the fusion module for the fusion module to generate a next first fusion result at a next time point; and when the first sensor is unsuccessfully paired, the failure determination module determines whether a target object of a first predicted fusion result is within a sensing range of the first sensor, and whether the sensing ranges of the first sensor and the second sensor overlap each other;

if No, the failure determination module transmits the sensor information of the multiple sensors to the fusion module for the fusion module to generate the next first fusion result;

if Yes, the failure determination module determines the first sensor as the failed sensor and transmits the failure message to the self-adaptive compensation module.

5. The system as claimed in claim 1, wherein when the self-adaptive compensation module receives the failure message, the self-adaptive compensation module further checks whether a prior first fusion result at a prior time point exists;

if Yes, the self-adaptive compensation module generates a predicted fusion result based on the prior first fusion result, wherein the characteristic relationship is a characteristic relationship among the predicted fusion result and the sensor information of the multiple sensors;

if No, the self-adaptive compensation module reads a preset fusion result from the storage, wherein the characteristic relationship is a characteristic relationship among the preset fusion result and the sensor information of the multiple sensors.

6. A multi-sensor self-adaptive failure compensation method applied to a self-driving vehicle and performed by a processor electrically connected to multiple sensors and a storage;

wherein the multiple sensors are respectively mounted and arranged in or on the self-driving vehicle to sense a surrounding environment of the self-driving vehicle, sensing ranges of any two of the multiple sensors overlap each other, and each sensor is configured to detect an object and transmit a sensor information;

wherein the storage stores information of a pairing table defining pairing statuses among the multiple sensors, and any two paired sensors represent that the sensing ranges of the two sensors overlap each other;

wherein the processor reads the pairing table from the storage to determine the pairing statuses of the sensors by searching the pairing table;

the method comprising steps as follows:

generating a first fusion result based on the sensor information of the multiple sensors and storing the first fusion result in the storage;

determining a characteristic relationship among the sensor information of the multiple sensors;

determining whether there is a failed sensor among the multiple sensors to generate a sensor compensation information corresponding to the failed sensor based on the sensor information of a valid sensor among the multiple sensors and the characteristic relationship, such that the sensor compensation information corresponds to the failed sensor to compensate for the lack of sensor information from the failed sensor; and generating a second fusion result based on the sensor information of the valid sensor and the sensor compensation information and storing the second fusion result in the storage;

wherein the processor implements autonomous driving for the self-driving vehicle based on either the first fusion result or the second fusion result, the first fusion result is adopted when all of the multiple sensors are determined as valid sensors, and the second fusion result is adopted when at least one of the multiple sensors is determined as the failed sensor.

7. The method as claimed in claim 6, wherein:

the multiple sensors comprise a first sensor and a second sensor;

the step of determining whether there is a failed sensor among the multiple sensors comprises steps as follows:

performing a target object tracking pairing to the sensor information of the multiple sensors with the first fusion result respectively;

when the first sensor and the second sensor are successfully paired, generating a next first fusion result at a next time point based on the sensor information of the multiple sensors; and when the first sensor is unsuccessfully paired, determining whether a target object of a first predicted fusion result is within a sensing range of the first sensor, and whether the sensing ranges of the first sensor and the second sensor overlap each other;

if No, generating the next first fusion result based on the sensor information of the multiple sensors; and if Yes, determining the first sensor as the failed sensor.

8. The method as claimed in claim 6, wherein:

the sensor information transmitted by each sensor comprises a confidence level information; and the step of determining whether there is a failed sensor among the multiple sensors comprises steps as follows:

determining whether the confidence level information of the multiple sensors is reliable respectively;

if No, determining the unreliable sensor as the failed sensor;

if Yes, generating a next first fusion result at a next time point based on the sensor information of the multiple sensors.

9. The method as claimed in claim 6, wherein:

the sensor information of each sensor comprises a confidence level information;

the step of determining whether there is a failed sensor among the multiple sensors comprises steps as follows:

determining whether the confidence level information of the multiple sensors is reliable respectively;

if No, determining an unreliable sensor as the failed sensor; and if Yes, performing a target object tracking pairing to the sensor information of the multiple sensors with the first fusion result respectively, wherein the multiple sensors comprise a first sensor and a second sensor;

when the first sensor and the second sensor are successfully paired, generating a next first fusion result at a next time point based on the sensor information of the multiple sensors;

when the first sensor is unsuccessfully paired, determining whether a target object of a first predicted fusion result is within a sensing range of the first sensor, and whether the sensing ranges of the first sensor and the second sensor overlap each other;

if No, generating the next first fusion result based on the sensor information of the multiple sensors;

if Yes, determining the first sensor as the failed sensor.

10. The method as claimed in claim 6, wherein after one of the multiple sensors is determined as the failed sensor, the method further comprises steps as follows:

checking whether a prior first fusion result at a prior time point exists;

if Yes, generating a predicted fusion result based on the prior first fusion result, wherein the characteristic relationship is a characteristic relationship among the predicted fusion result and the sensor information of the multiple sensors;

if No, reading a preset fusion result from the storage, wherein the characteristic relationship is a characteristic relationship among the preset fusion result and the sensor information of the multiple sensors.

* * * * *